(12) United States Patent
Li et al.

(10) Patent No.: US 11,681,807 B2
(45) Date of Patent: *Jun. 20, 2023

(54) INFORMATION HANDLING SYSTEM WITH MECHANISM FOR REPORTING STATUS OF PERSISTENT MEMORY FIRMWARE UPDATE

(71) Applicant: DELL PRODUCTS L.P., Round Rock, TX (US)

(72) Inventors: Xi Li, Round Rock, TX (US); Ching-Lung Chao, Austin, TX (US)

(73) Assignee: Dell Products L.P., Round Rock, TX (US)

(*) Notice: Subject to any disclaimer, the term of this patent is extended or adjusted under 35 U.S.C. 154(b) by 127 days.

This patent is subject to a terminal disclaimer.

(21) Appl. No.: 17/313,507

(22) Filed: May 6, 2021

(65) Prior Publication Data

US 2021/0256131 A1 Aug. 19, 2021

Related U.S. Application Data

(63) Continuation of application No. 16/408,929, filed on May 10, 2019, now Pat. No. 11,068,596.

(51) Int. Cl.
G06F 9/44 (2018.01)
G06F 21/57 (2013.01)
G06F 9/4401 (2018.01)
G06F 11/22 (2006.01)

(52) U.S. Cl.
CPC ............ *G06F 21/57* (2013.01); *G06F 9/4401* (2013.01); *G06F 11/2284* (2013.01)

(58) Field of Classification Search
CPC ..... G06F 21/57; G06F 9/4401; G06F 11/2284
See application file for complete search history.

(56) References Cited

U.S. PATENT DOCUMENTS

| | | | |
|---|---|---|---|
| 6,205,526 B1 | 3/2001 | Tanuma | |
| 10,199,860 B2 | 2/2019 | Harris et al. | |
| 2007/0055854 A1 | 3/2007 | Chang et al. | |
| 2012/0198430 A1 | 8/2012 | Wakasa | |
| 2015/0180920 A1 | 6/2015 | Hunter | |
| 2015/0309165 A1 | 10/2015 | Elwart et al. | |
| 2017/0293520 A1 | 10/2017 | Onniyil et al. | |
| 2017/0337147 A1 | 11/2017 | Patel et al. | |
| 2018/0074884 A1* | 3/2018 | Cady | G06F 11/0787 |
| 2020/0042391 A1 | 2/2020 | Pepper et al. | |
| 2020/0210586 A1 | 7/2020 | Cariello | |

* cited by examiner

*Primary Examiner* — Zahid Choudhury
(74) *Attorney, Agent, or Firm* — Larson Newman, LLP

(57) ABSTRACT

During a power-on self-test (POST), a basic input/output system (BIOS) retrieves an attribute value associated with the persistent memory device, and compares the attribute value to a default value. In response to the attribute value matching the default value, the BIOS may determine that a firmware management protocol was not executed during a previous POST. In response to the attribute value not matching the default value, the BIOS may compare the attribute value to a current firmware version of firmware within the persistent memory device.

20 Claims, 5 Drawing Sheets

INFORMATION HANDLING SYSTEM WITH MECHANISM FOR REPORTING STATUS OF PERSISTENT MEMORY FIRMWARE UPDATE

FIELD OF THE DISCLOSURE

The present disclosure generally relates to information handling systems, and more particularly relates to an information handling system with a mechanism for reporting the status of a persistent memory firmware update.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

During a power-on self-test (POST), a basic input/output system (BIOS) may retrieve an attribute value associated with the persistent memory device, and compare the attribute value to a default value. In response to the attribute value matching the default value, the BIOS determines that a firmware management protocol was not executed during a previous POST. In response to the attribute value not matching the default value, the BIOS compares the attribute value to a current firmware version of firmware within the persistent memory device. In response to the attribute value matching the current firmware version, the BIOS logs a firmware update successful message.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system includes a persistent memory device, a memory controller, and a BIOS. The BIOS begins a power-on self-test (POST) of the information handling system. During the POST, the BIOS retrieves an attribute value associated with the persistent memory device; compare the attribute value to a default value. In response to the attribute value matching the default value, the BIOS determines that a firmware management protocol was not executed during a previous POST. In response to the attribute value not matching the default value, the BIOS compares the attribute value to a current firmware version of firmware within the persistent memory device. In response to the attribute value matching the current firmware version, the BIOS logs a firmware update successful message.

The information handling system disclosed herein to report whether a firmware update in a persistent memory device was successful provides various advantages and benefits over other systems that perform firmware updates in persistent memory devices. In particular, this system utilizes an attribute value in a BIOS non-volatile random access memory (NVRAM) to track the status of a firmware update for a persistent memory device as executed by a firmware management protocol. In an example, during a power-on self-test (POST) following a cold reset, the BIOS may retrieve the attribute value from the BIOS NVRAM and compare the attribute value to one or more other values to determine a status of the firmware update. For example, the BIOS may compare the attribute value to a default value, an error code, and a staged firmware version to determine whether the firmware update is respectively not run during a previous boot, not updated successful, or updated successfully. These operations are advantages and benefits over previous systems implementing firmware management protocol operations for persistent memory devices, which only return a status of whether a firmware update was properly staged not whether the firmware update was successful.

Figure 1:
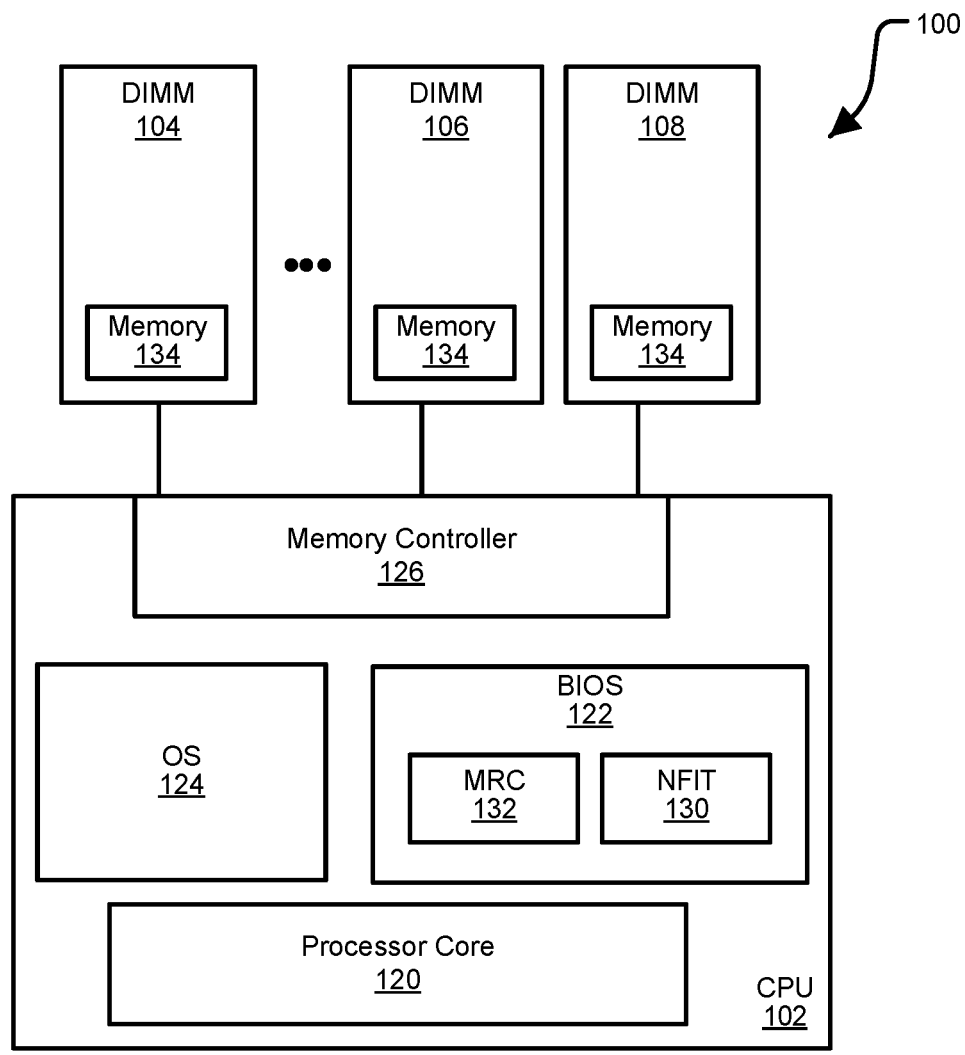
FIG. 1 is a block diagram of a portion of an information handling system according to at least one embodiment of the disclosure.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other input/output (I/O) devices, such as a keyboard, a mouse, and a video display. The information handling system may also include one or more busses operable to transmit communications between the various hardware components.

The information handling system 100 includes a CPU or processor 102 and dual in-line memory modules (DIMMs) 104, 106, and 108. In an embodiment, information handling system 100 may include additional components, not shown in or discussed with reference to FIG. 1, without varying from the scope of this disclosure. In an embodiment, the information handling system 100 can be a server, a personal computer, a laptop computer, or the like. The CPU 102 includes a processor core 120, a BIOS 122, an operating system (OS) 124, and a memory controller 126. In an embodiment, CPU 102 may include additional components, not shown in or discussed with reference to FIG. 1, without varying from the scope of this disclosure. BIOS 122 is firmware utilized during a boot process, such as a power-on self-test (POST), to initialize the hardware components within information handling system 100. In an embodiment, the hardware components within information handling system 100 initialized by BIOS 122 may include, but are not limited to, CPU 102 and DIMMs 104, 106, and 108. BIOS 122 may also provide runtime services for the OS 124 and other programs with CPU 102. BIOS 122 may include a non-volatile dual in-line memory module (NVDIMM) firmware interface table (NFIT) 130, and memory reference code (MRC) 132. In an embodiment, NFIT 130 can store information including, but not limited to, persistent memory ranges and properties for DIMMs 104, 106, and 108.

DIMMS 104, 106, and 108 may include one or more types of memory 134 accessible by CPU 102. For example, DIMMs 104, 106, and 108 may include dynamic random access memory (DRAM) and flash memory storage. In an embodiment, DIMMs 104, 106, and 108 may be implemented as one or more types of regular DIMMs with only volatile memory, or one or more types of non-volatile DIMMs (NVDIMMs). In an example, one or more types of NVDIMMs may include: NVDIMM-F including only persistent memory, such as flash storage, NVDIMM-N including both flash storage and DRAM on the same memory module, NVDIMM-P including persistent DRAM, and NVDIMM-X including NAND flash storage and DRAM on the same memory module. In this embodiment, DIMMs 104, 106, 108 may be Apache Pass (AEP) devices with memory 134 configured according to one of the memory types stated above, such as NVDIMM-F. One of ordinary skill in the art will recognize that while FIG. 1 illustrates DIMMs 104, 106, and 108, this disclosure is not limited to three DIMMs but can be applied to any number of DIMMs, as indicated by the ellipses in between DIMMs 104 and 106. In an embodiment, one or more of DIMMs 104, 106, and 108 may include additional components, not shown in or discussed with reference to FIG. 1, without varying from the scope of this disclosure.

CPU 102 may operate to provide data processing functionality of information handling system 100, such as is typically associated with an information handling system. As such, CPU 102 represents a data processing apparatus, such as one or more processor cores, and the associated data I/O functionality, such as a chipset component, and other I/O processor components. CPU 102 operates to execute machine-executable code to perform the data processing tasks associated with information handling system 100.

Memory controller 126 represents a portion of a processor complex that is dedicated to the management of the data storage and retrieval from the memory devices of information handling system 100, and information handling system 100 may include one or more additional memory controllers similar to the memory controller 126, as needed or desired. Memory controller 126 may reside on a system printed circuit board, may be integrated into an I/O processor component, may be integrated with a processor on a system-on-a-chip (SoC), or may be implemented in another way, as needed or desired. Memory controller 126 operates to provide data and control interfaces to one or more DIMMs, such as DIMMs 104, 106, and 108, in accordance with a particular memory architecture. For example, memory controller 126 and the DIMMs 104, 106, and 108 may operate in accordance with a Double-Data Rate (DDR) standard, such as a JEDEC DDR4 or DDR5 standard.

In certain examples, before any usable memory 134 within DIMMs 104, 106, and 108 may be accessed by OS 124, BIOS 122 may perform a POST for information handling system 100. During the POST, BIOS 122 execute MRC 132 to access information associated with DIMMs 104, 106, and 108 and configure a memory address decode register for DIMMs 104, 106, and 108 as will be described herein. In an embodiment, the information associated with DIMMs 104, 106, and 108 stored within the memory address decode register may include, but is not limited to, a mode of operation for DIMMs 104, 106, and 108, and a total amount of memory for DIMMs 104, 106, and 108. The mode of operation can be an application-direct mode, a memory mode, a storage mode, or the like. In the application-direct mode, applications executed by processor core 120 via OS 124 can directly access data stored within DIMMs 104, 106, and 108. In the memory mode, a DRAM portion of DIMMs 104, 106, and 108 can be accessed by processor core 120 of CPU 102 to store data in DIMMs 104, 106, and 108. In the storage mode, data can be accessed in DIMMs 104, 106, and 108 in a block data format. These modes of operation can be set as attributes for DIMMs 104, 106, and 108 by the OS 124, by unified extensible firmware interface (UEFI) environment of BIOS 122, or the like. After the memory address decode register has been configured for DIMMs 104, 106, and 108 and other operations of POST have been completed, BIOS 122 may exit POST and processor core 120 may perform one or more runtime operations of OS 124.

Figure 2:
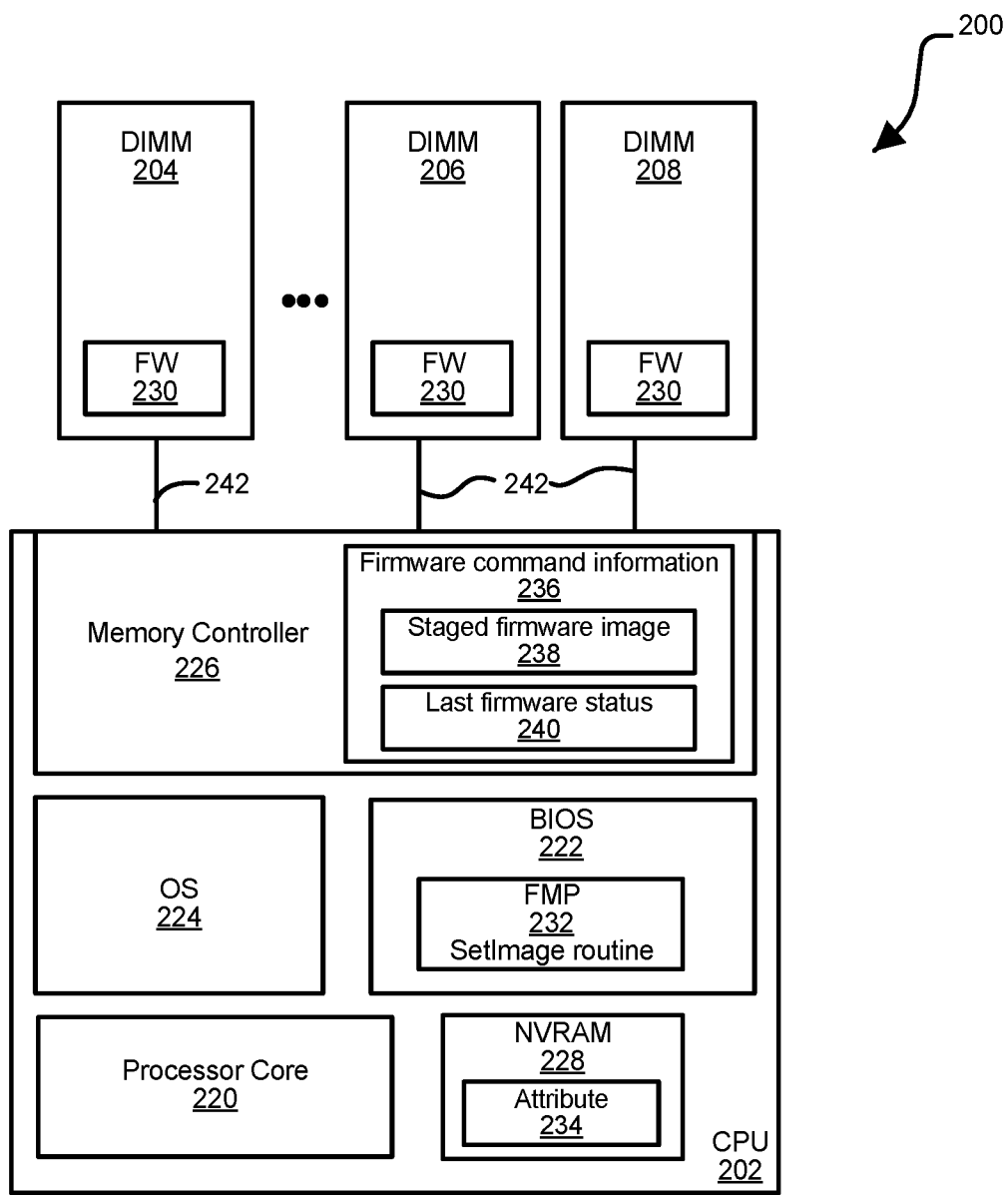
FIG. 2 is a block diagram of another portion of an information handling system according to at least one embodiment of the disclosure.

FIG. 2 illustrates a portion of an information handling system 200 including a CPU 202 and dual in-line memory modules (DIMMs) 204, 206, and 208 (DIMMs 204-208). In an embodiment, information handling system 200 can be a server, a personal computer, a laptop computer, or the like, such as or substantially similar to information handling system 100 of FIG. 1. CPU 202 includes a processor core 220, a BIOS 222, an OS 224, a memory controller 226, and a non-volatile random access memory (NVRAM) 228. Each of DIMMs 204-208 includes firmware 230. BIOS 222 includes a firmware management protocol (FMP) 232, which may be utilized in updating firmware within components of information handling system 200 including, but not limited to, DIMMs 204-208. NVRAM 228 stores data for associated with BIOS 222 including, but not limited to, an attribute 234 associated with a firmware update notification system within information handling system 200. Memory controller 226 stores firmware command information 236, which in turn includes a staged firmware image 238 for DIMMs 204-208 as will be described herein. In certain examples, information handling system 200 may include additional or fewer components, not shown in or discussed with reference to FIG. 2, without varying from the scope of this disclosure. For example, FIG. 2 illustrates DIMMs 204-208 installed within information handling system 200. However, depending on an implementation of information handling system 200, less or more DIMMs, such as 1 to 6 DIMMs, may be installed within information handling system 200 without varying from the scope of this disclosure.

In an example, CPU 202 may separately communicate with each of the DIMMs 204-208 via one or more communication buses 242. In an embodiment, each communication bus 242, shown between CPU 202 and DIMM 204, 206, 208, or 210, may represent one or more different communication buses including, but not limited to, a System Management Bus (SMBus) and a Peripheral Component Interconnect (PCI).

During operation of information handing system 200, BIOS 222 may perform one or more operations to update firmware 230 within one or more of DIMMs 204-208 in conjunction with a firmware update notification system within information handling system 200. In an embodiment, DIMMs 204-208 are persistent memory devices, such that the persistent memory devices 204-208 may be implemented as one or more of the following types of non-volatile DIMMs: NVDIMM-F including only persistent memory; NVDIMM-N including both flash storage and DRAM on the same memory module; NVDIMM-P including persistent DRAM; and NVDIMM-X including NAND flash storage and DRAM on the same memory module.

In an example, BIOS 222 may configure a firmware update notification system within information handling system 200 in any suitable manner. For example, BIOS 222 may store a default value within the BIOS NVRAM 228, such that a BIOS NVRAM attribute value 234 may be set equal to the default value. In an embodiment, the default value is any suitable value, such as a non-zero value, utilized to determine whether any operations of the firmware update for DIMMs 204-208 have been performed as will be described herein. In an embodiment, BIOS 222 may retrieve the default value from any suitable memory location, such as a register within NVRAM 228, to implement the firmware update notification system described herein.

In an embodiment, firmware 230 within DIMMs 204-208 may be updated using any suitable operations or protocols. The description of updating firmware 230 within DIMMs 204-208 may be described with respect to any number of DIMMs 204-208. However, for brevity and clarity the updating of firmware 230 will only be described with respect to DIMM 204. In an example, BIOS 222 may utilize FMP 232 to perform an update of firmware 230 within DIMM 204.

In certain examples, FMP 232 may include in any suitable number of steps or operations to enable BIOS 222 to update firmware 230 of DIMM 204. For example, in a first operation, BIOS 222 may execute a SetImage routine of FMP 232 to load a firmware image for the firmware update into memory controller 226. In an example, the SetImage routine of FMP 232 may be the only operation of the update of firmware 230 performed by BIOS 222 during a first post of information handling system 200.

In an embodiment, the firmware image is stored in a register of firmware command information 236 within memory controller 226. For example, the firmware image may be stored in a staged firmware revision portion of the firmware command information. In an embodiment, the firmware command information 236 may be formatted in any suitable manner. In an example, firmware command information 236 includes a register 238 to store a staged firmware revision. In certain examples, data within register 238 may formatted in any suitable manner including, but not limited to, the combination of a 2 digit product number, a 2-digit revision number, a 2-digit security revision number, and a 4-digit build number. Firmware command information 236 also includes a register 240 to store a last firmware update status. In an example, register 240 may store data to indicate the status of the last firmware update. With respect to firmware updates of persistent memory devices, such as DIMM 204, the data within register 240 may indicate only whether the staging of the firmware image is successful, but not whether firmware 610 in DIMM 204 was successfully updated.

Upon execution of the SetImage routine of FMP 232, a return status of the SetImage routine, such as success or failure, may be provided and BIOS 222 may perform one or more operations based on the return status. In an embodiment, if the return status of SetImage routine in FMP 232 is a failure, BIOS 222 may set BIOS NVRAM attribute 234 to an error code value. In an example BIOS NVRAM attribute 234 may be set in any suitable manner including, but not limited to, replacing the default value previously stored in BIOS NVRAM attribute 234 with the error code. In an embodiment, the error code may be any pre-defined value that is different from the default value, and that BIOS 222 retrieve from any suitable memory location, such as a register within NVRAM 228, to implement the firmware update notification system described herein.

In an example, if the return status of the SetImage routine in FMP 232 is a success, BIOS 222 may retrieve the staged firmware number from register 238 of firmware command information 236 and store the staged firmware number in BIOS NVRAM attribute 234. In an embodiment, BIOS 222 may set the BIOS NVRAM attribute 234 by replacing the default value previously stored in the BIOS NVRAM attribute 234 with the staged firmware version number. After the return status of SetImage routine is determined, BIOS 222 may not perform another firmware update operation for firmware 230 until detection of a cold reset of information handling system 200. Upon detection of the cold reset of information handling system 200, BIOS 222 may perform a POST for information handling system 200.

During the POST, one or more operations may be performed to complete the update of firmware 230 in DIMM 204 with the firmware version staged in register 238 of memory controller 226 during the previous POST. For example, FMP 232 may cause memory controller 226 to provide the staged firmware version to DIMM 204 via communication bus 242. In response to receiving the staged firmware version, DIMM 204 may replace a previous firmware version of firmware 230 with the received firmware version.

During the POST, BIOS 222 may perform one or more operations to determine whether firmware 230 within DIMM 204 has been successfully updated. In an example, BIOS 222 may access NVRAM 228 in any suitable manner to retrieve the attribute value 234 stored within NVRAM 228. In an embodiment, the current attribute value 234 retrieved by BIOS 222 may be the attribute value 234 stored within NVRAM 228 during the previous POST operation. In response to retrieving the attribute value 234, BIOS 222 may compare the attribute value 234 to one or more values to determine whether the update of firmware 230 was successful.

In an example, BIOS 222 may compare the attribute value 234 with the default value. If BIOS 222 determines that the attribute value 234 matches the default value, BIOS 222 may determine that the FMP 232 was not executed during the previous POST. In response to the FMP 232 not being executed, BIOS 222 may not make a determination with respect to whether the update of firmware 230 was successful because no firmware update was attempted. Based on a firmware update not being attempted, BIOS 222 does not report any message.

In response to attribute value 234 not matching the default value, BIOS 222 may perform one or more operations to determine whether attribute value 234 matches a current firmware version number in firmware 230 of DIMM 204. In an example, BIOS 222 may retrieve the current firmware version of firmware 230 via memory controller 226 and communication bus 242. In response to receiving the current firmware version, BIOS 222 may compare attribute value 234 to the current firmware version of firmware 230. Based on the comparison, BIOS 222 may determine whether the update of firmware 230 was successful. For example, if the attribute value 234 matches the current firmware version of firmware 230, BIOS 222 may determine that a firmware version staged in memory controller 226 during the previous POST was installed within DIMM 204 during the current POST, such that the update of firmware 230 was successful. In response to the update of firmware 230 being successful, BIOS 222 may log a firmware update success message in any suitable memory device, such as NVRAM 228 or a local cache of processor core 220, of information handling system 200.

However, if attribute value 234 does not match the current firmware version of firmware 230, BIOS 222 may determine that the update of firmware 230 was not successful. In certain examples, the update of firmware 230 may not be successful based on one or more conditions including, but not limited to, the SetImage routine not being successful, such that the attribute value 234 would match the error code, the staged firmware version in register 238 was not provided to DIMM 230, and update of firmware 230 within DIMM 230 failed. In response to the determination that the update of firmware 230 was a failure, BIOS 222 may log a firmware update failure message in any suitable memory device, such as NVRAM 228 or a local cache of processor core 220, of information handling system 200.

Thus, information handling system 200 may include a firmware update notification system including a combination of code for BIOS 222 and attribute 234 within NVRAM 228 to determine whether an update of firmware of a persistent memory device, such as firmware 230 of DIMM 204, 206, or 208, was successful. Upon the determination of whether firmware 230 has been successfully updated and other operations of POST have been completed, BIOS 222 may exit POST and processor core 220 may perform one or more runtime operations of OS 224. For example, processor core 220 may provide a message logged by BIOS 222 during the POST, to a display device, such as display device 590 of FIG. 5, to enable an individual associated with information handling system 200 to know whether the update of firmware 230 was successful. In an example, processor core 220 may provide the firmware update success message or the firmware update failure message on the display device.

Figure 3:
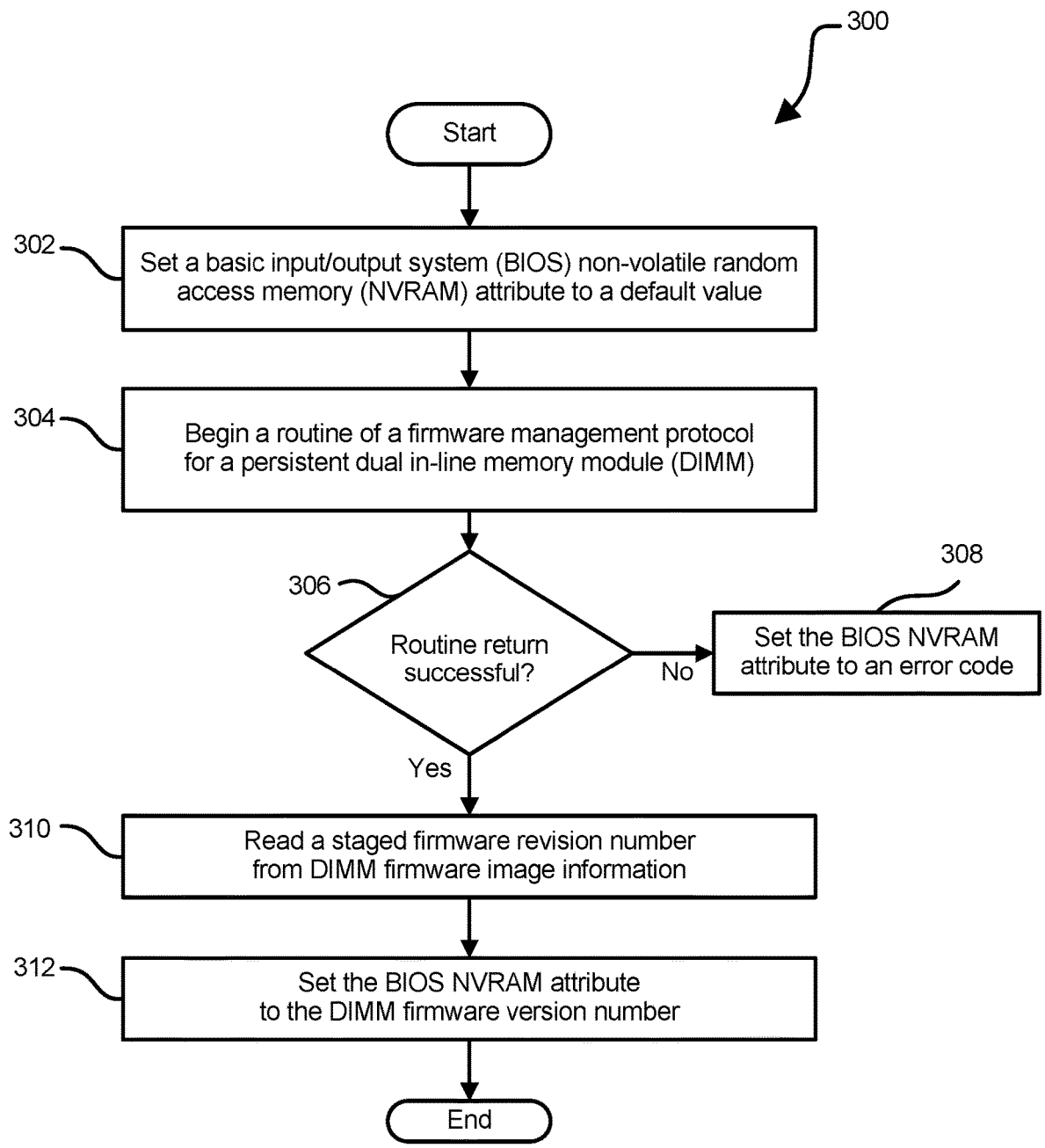
FIG. 3 is a flow diagram of a method for setting a BIOS non-volatile random access memory (NVRAM) attribute to a value based on a result of a SetImage routine according to at least one embodiment of the disclosure.

FIG. 3 is a flow diagram of a method 300 for setting a BIOS non-volatile random access memory (NVRAM) attribute to a value based on a result of a routine according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 300 of FIG. 3 may be executed by a BIOS of an information handling system to perform the routine of a firmware management protocol (FMP) to stage a firmware update for a persistent memory device in a memory controller for that device. In an example, the persistent memory device may be a dual in-line memory module (DIMM), such as NVDIMM-F including only persistent memory, NVDIMM-N including both flash storage and DRAM on the same memory module, NVDIMM-P including persistent DRAM, and NVDIMM-X including NAND flash storage and DRAM on the same memory module.

At block 302, a BIOS non-volatile random access memory (NVRAM) attribute is set to a default value. Block 302 may be performed in a manner described above. In an embodiment, the BIOS NVRAM attribute may be set by any suitable component, such as the BIOS of the information handling system. In an example, the default value may any value, such as any non-zero value.

At block 304, a routine of the FMP for the persistent DIMM is begun. Block 304 may be performed in a manner described above. In an embodiment, the routine may be any suitable routine to store or stage the firmware for the persistent DIMM in a memory controller of the information handling system. In an example, the routine may be a SetImage routine of the FMP.

At block 306, a determination is made whether the routine is successful. Block 306 may be performed in a manner described above. In an embodiment, upon completion of the routine, a status, such as successful or not, for the staging of the firmware update may be returned to the BIOS.

At block 308, in response to the routine not being successful, the BIOS NVRAM attribute is set to an error code. Block 308 may be performed in a manner described above. In an embodiment, the error code may be any suitable pre-defined value different than the default value.

At block 310, in response to the routine being successful, the staged firmware revision number is read DIMM firmware image information. Block 310 may be performed in a manner described above. In an embodiment, the BIOS may communicate, in any suitable manner, with the memory controller to retrieve the DIMM firmware image information. In an example, the DIMM firmware image information may be located in firmware command information within the memory controller.

At block 312, the BIOS NVRAM attribute is set to the DIMM firmware version number. Block 312 may be performed in a manner described above. In an embodiment, the BIOS may set or store the DIMM firmware version number in the BIOS NVRAM attribute for use by the BIOS to determine a status of the firmware update upon a cold restart of the information handling system.

Figure 4:
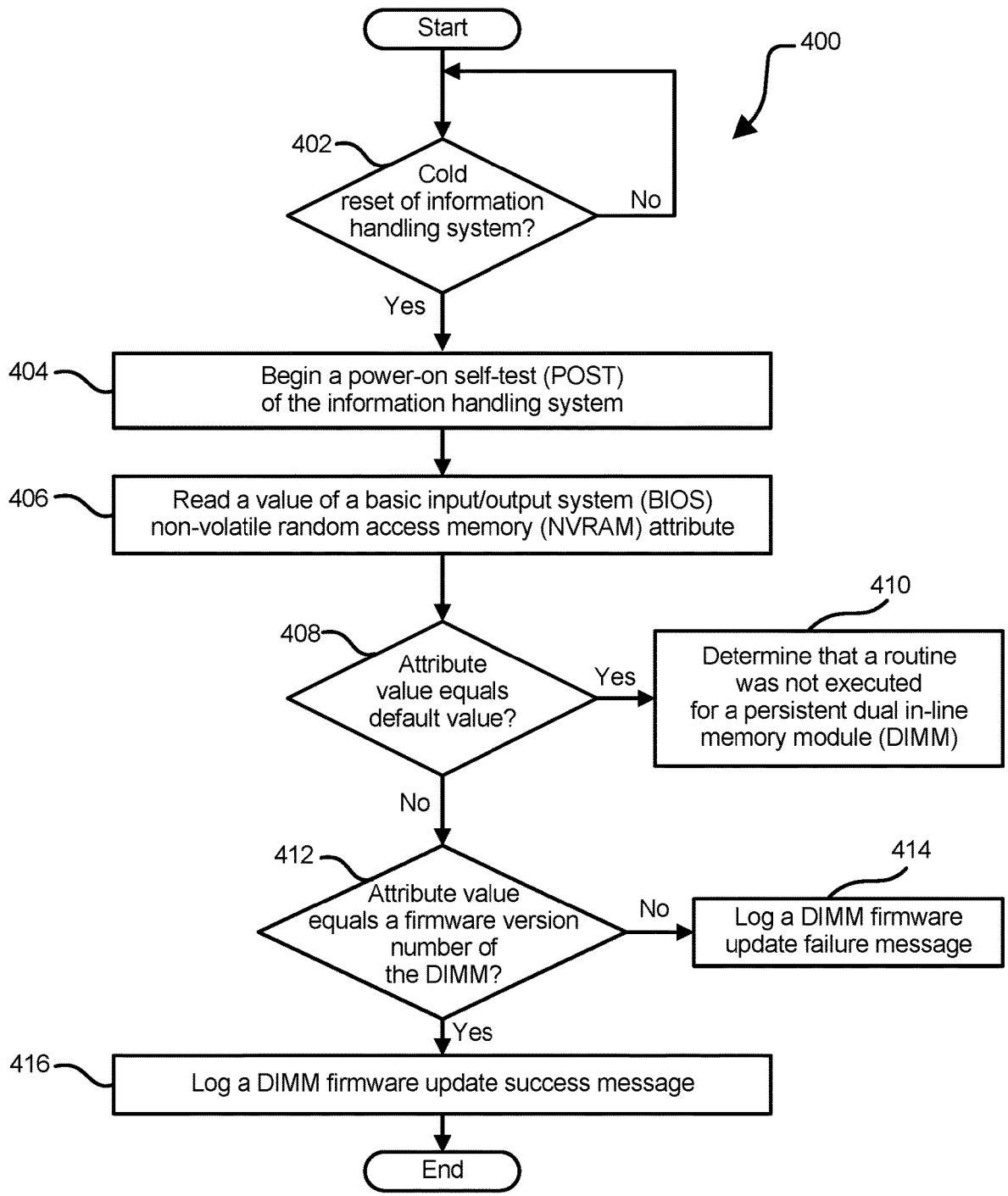
FIG. 4 is a flow diagram of a method for reporting a status of a persistent memory firmware update according to at least one embodiment of the present disclosure.

FIG. 4 is a flow diagram of a method 400 for reporting a status of a persistent memory firmware update according to at least one embodiment of the present disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 400 may follow the completion of method 300 of FIG. 3.

At block 402, a determination is made whether a cold reset of the information handling system was performed. Block 402 may be performed in a manner described above. At block 404, in response to a cold reset of the information handling system, a power-on self-test (POST) of the information handling system is begun. Block 404 may be performed in a manner described above. At block 406, a value of BIOS non-volatile random access memory (NVRAM) attribute is read. Block 406 may be performed in a manner described above.

At block 408, a determination is made whether the BIOS NVRAM attribute equals a default value. Block 408 may be performed in a manner described above. In an embodiment, a firmware management protocol (FMP) may store the default value in the BIOS NVRAM attribute prior to a routine being executed. The default value may be any non-zero value. In an example, the routine of the FMP may be a SetImage routine. At block 410, in response to the BIOS NVRAM attribute value being equal to the default value, a determination is made that the routine was not executed for a persistent dual in-line memory module (DIMM). Block 410 may be performed in a manner described above.

At block 412, in response to the BIOS NVRAM attribute value not equaling the default value, a determination is made whether the BIOS NVRAM attribute value equals a firmware version number of the DIMM. Block 412 may be performed in a manner described above. In an embodiment, the firmware version number of the DIMM may be retrieved in any suitable manner for comparison with the BIOS NVRAM attribute value. For example, the memory controller of the information handling system may communicate with the DIMM to retrieve the firmware version number of the DIMM.

At block 414, in response to the BIOS NVRAM attribute value not equaling the firmware version number of the DIMM, a DIMM firmware update failure message is logged. Block 414 may be performed in a manner described above. In an embodiment, the failure message may be logged by storing the failure message in any suitable memory location, such as a local cache of a processor of the information handling system. In an embodiment, the failure message may be provided on a display device to indicate to an individual associated with the information handling system that the DIMM firmware update failed.

At block 416, in response to the BIOS NVRAM attribute value equaling the firmware version number of the DIMM, a DIMM firmware update success message is logged. Block 416 may be performed in a manner described above. In an embodiment, the success message may be logged by storing the success message in any suitable memory location, such as the local cache of the processor. In an embodiment, the success message may be provided on the display device to indicate to the individual that the DIMM firmware update succeeded.

Figure 5:
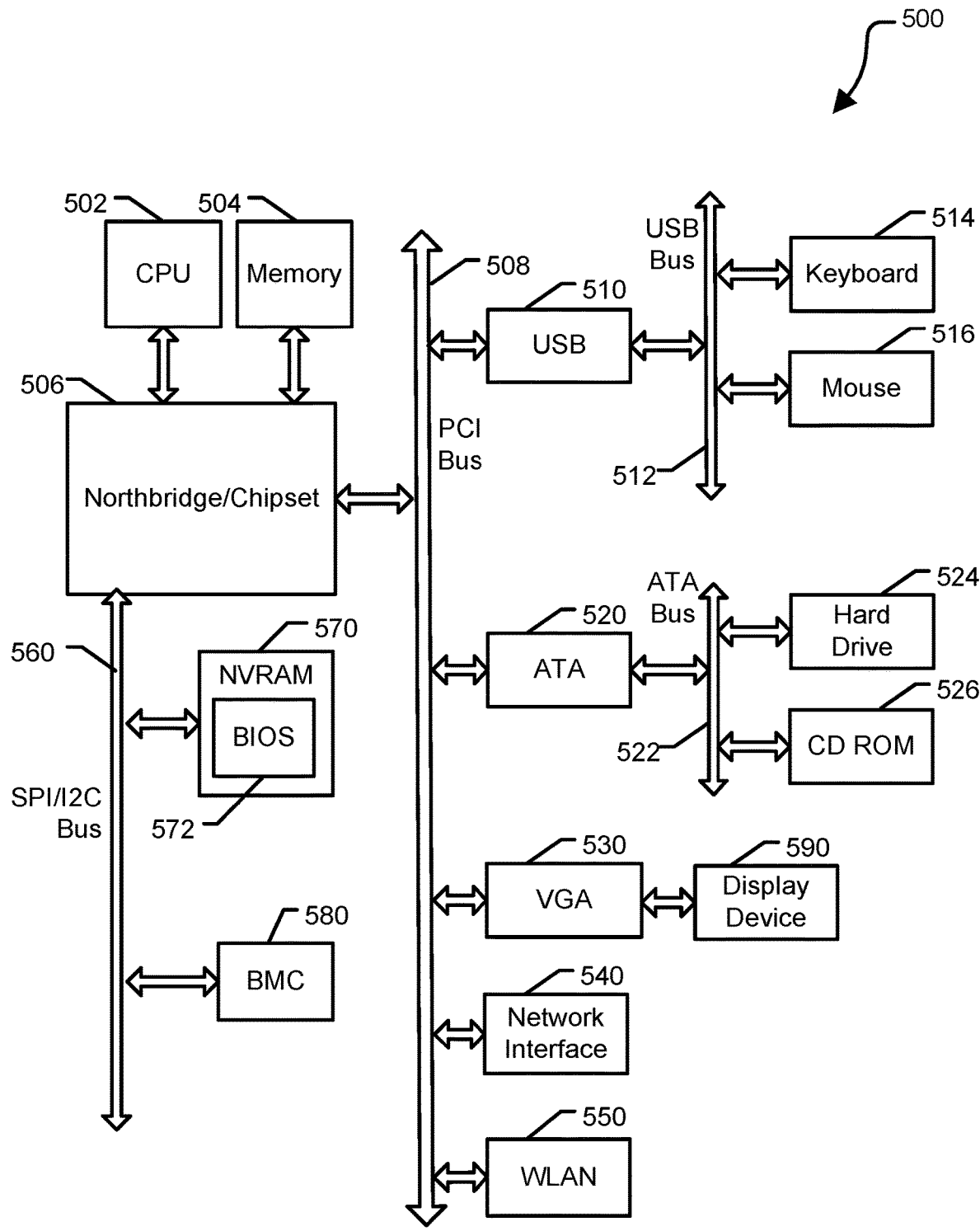
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an embodiment, information handling system 500 may be information handling system 100 of FIG. 1 and/or information handling system 200 of FIG. 2. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various I/O devices, such as a keyboard, a mouse, and a video display. For example, device controller 530 may provide data to a display device 590 to visually present the information to an individual associated with information handling system 500. An example of information handling system 500 includes a multi-tenant chassis system where groups of tenants (users) share a common chassis, and each of the tenants has a unique set of resources assigned to them. The resources can include blade servers of the chassis, I/O modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    beginning, by a basic input/output system (BIOS), a power-on self-test (POST) of an information handling system; and
    during the POST:
        executing a routine to stage a firmware update image for a persistent memory device in a memory controller of the information handling system;
        determining whether the routine is successful;
        in response to the routine being successful, setting an attribute value to a staged firmware version, wherein the staged firmware version is associated with the firmware update image stored within the memory controller; and
        in response to the routine not being successful, setting the attribute value to a pre-defined error code.

2. The method of claim 1, further comprising:
    during a subsequent POST:
        retrieving the attribute value associated with a persistent memory device;
        comparing the attribute value to the staged firmware version; and
        in response to the attribute value matching the staged firmware version, providing a firmware update successful message on a display device of the information handling system, the firmware update successful message indicating that firmware of the persistent memory device was successfully updated.

3. The method of claim 2, further comprising:
    during the subsequent POST:
        in response to the attribute value not matching the staged firmware version, logging a firmware update failure message.

4. The method of claim 2, further comprising:
    detecting a cold reset of the information handling system prior to beginning the subsequent POST.

5. The method of claim 1, further comprising:
    during a subsequent POST:
        retrieving the attribute value associated with a persistent memory device;
        comparing the attribute value to a default value;
        in response to the attribute value matching the default value, determining that a firmware management protocol was not executed during the previous POST.

6. The method of claim 1, further comprising:
    during the subsequent POST:
        in response to the attribute value not matching the staged firmware version, providing a firmware update not successful message on a display device of the information handling system, the firmware update not successful message indicating that firmware of the persistent memory device was not successfully updated.

7. The method of claim 1, wherein the persistent memory device is a persistent dual in-line memory module.

8. The method of claim 1, wherein the attribute value is stored in a BIOS non-volatile random access memory.

9. An information handling system comprising:
    a persistent memory device;
    a memory controller to communicate with the persistent memory device; and
    a basic input/output system (BIOS) that, during a power-on self-test (POST) of the information handling system:
        executes a routine to stage a firmware update image for the persistent memory device in the memory controller of the information handling system; determines whether the routine is successful; in response to the routine being successful, sets an attribute value to a staged firmware version, wherein the staged firmware version is associated with the firmware update image stored within the memory controller; and in response to the routine not being successful, sets the attribute value to a pre-defined error code.

10. The information handling system of claim 9, wherein during a subsequent POST, the BIOS to: retrieve the attribute value associated with a persistent memory device; compare the attribute value to the staged firmware version; and in response to the attribute value matching the staged firmware version, provide a firmware update successful message on a display device of the information handling system, the firmware update successful message indicating that firmware of the persistent memory device was successfully updated.

11. The information handling system of claim 10, wherein during the subsequent POST and in response to the attribute value not matching the staged firmware version, the BIOS to: log a firmware update failure message.

12. The information handling system of claim 10, wherein the BIOS further to detect a cold reset of the information handling system prior to beginning the subsequent POST.

13. The information handling system of claim 9, wherein during a subsequent POST, the BIOS to: retrieve the attribute value associated with a persistent memory device; compare the attribute value to a default value; and in response to the attribute value matching the default value, determining that a firmware management protocol was not executed during the previous POST.

14. The information handling system of claim 9, during the subsequent POST and in response to the attribute value not matching the staged firmware version, the BIOS to provide a firmware update not successful message on a display device of the information handling system, the firmware update not successful message indicating that firmware of the persistent memory device was not successfully updated.

15. The information handling system of claim 9, wherein the persistent memory device is a persistent dual in-line memory module.

16. The information handling system of claim 9, wherein the attribute value is stored in a BIOS non-volatile random access memory (NVRAM).

17. A method comprising:
    beginning, by a basic input/output system (BIOS), a power-on self-test (POST) of an information handling system; and
    during the POST:
        setting an attribute value to a default value, the attribute value being associated with a persistent memory device of an information handling system;

executing a routine to stage a firmware update image for a persistent memory device in a memory controller of the information handling system;

if the routine is successful, then setting the attribute value to a staged firmware version, wherein the staged firmware version is associated with the firmware update image stored within the memory controller; and if the routine is not being successful, then setting the attribute value to a pre-defined error code.

18. The method of claim 17, further comprising:
during a subsequent POST:
retrieving the attribute value associated with a persistent memory device;

comparing the attribute value to the staged firmware version; and in response to the attribute value matching the staged firmware version, providing a firmware update successful message on a display device of the information handling system, the firmware update successful message indicating that firmware of the persistent memory device was successfully updated.

19. The method of claim 17, wherein the persistent memory device is a persistent dual in-line memory module.

20. The method of claim 17, wherein the attribute value is stored in a BIOS non-volatile random access memory.

\* \* \* \* \*